(12) United States Patent
Aerts et al.

(10) Patent No.: US 8,257,483 B2
(45) Date of Patent: *Sep. 4, 2012

(54) BITUMINOUS COLD GLUE

(75) Inventors: Hans Aerts, Lot (BE); Eric Bertrand, Lot (BE); Michel Getlichermann, Lot (BE)

(73) Assignee: S.A. Imperbel N.V., Lot (BE)

( * ) Notice: Subject to any disclaimer, the term of this patent is extended or adjusted under 35 U.S.C. 154(b) by 0 days.

This patent is subject to a terminal disclaimer.

(21) Appl. No.: 12/656,107

(22) Filed: Jan. 15, 2010

(65) Prior Publication Data

US 2010/0212546 A1 Aug. 26, 2010

(30) Foreign Application Priority Data

Jan. 16, 2009 (EP) ...................... 09150810

(51) Int. Cl.
- *C09J 195/00* (2006.01)
- *C08L 95/00* (2006.01)
- *C09D 191/00* (2006.01)
- *C09D 195/00* (2006.01)

(52) U.S. Cl. ..................... 106/248; 106/278; 106/281.1; 106/282; 106/283

(58) Field of Classification Search .................. 106/248, 106/278, 281.1, 282, 283
See application file for complete search history.

(56) References Cited

U.S. PATENT DOCUMENTS

| | | | | |
|---|---|---|---|---|
| 2,730,454 | A * | 1/1956 | Sommer et al. | 106/669 |
| 6,569,351 | B1 * | 5/2003 | Baumgardner et al. | 252/182.17 |
| 6,824,326 | B2 * | 11/2004 | Raad | 405/15 |
| 2005/0107499 | A1 * | 5/2005 | Georgeau et al. | 524/59 |
| 2008/0194738 | A1 * | 8/2008 | Crews et al. | 524/60 |
| 2009/0173254 | A1 * | 7/2009 | Aerts et al. | 106/662 |

FOREIGN PATENT DOCUMENTS

| | | |
|---|---|---|
| EP | 1 544 254 | 6/2005 |
| EP | 1 674 547 | 6/2006 |
| EP | 2055759 A1 * | 5/2009 |
| GB | 2 205 104 | 11/1988 |
| JP | 53-127525 A * | 11/1978 |
| JP | 59-58078 A * | 4/1984 |

OTHER PUBLICATIONS

Derwent-Acc-No: 2009-A81009, abstract of Chinese Patent Specification No. CH 101235209A (Jan. 2008).*

* cited by examiner

*Primary Examiner* — Anthony J Green
(74) *Attorney, Agent, or Firm* — Jacobson Holman PLLC

(57) ABSTRACT

A bituminous cold glue for cold gluing of construction material and comprising at least 35% by weight of bitumen and at least 10% by weight of oil, and further comprising clay and a dispersing agent, said oil being a vegetable oil compound, based on a carbon chain comprising at least one of the C6 to C12 carbon atoms and further comprising between 0.1 and 5% by weight of a solvent.

17 Claims, 1 Drawing Sheet

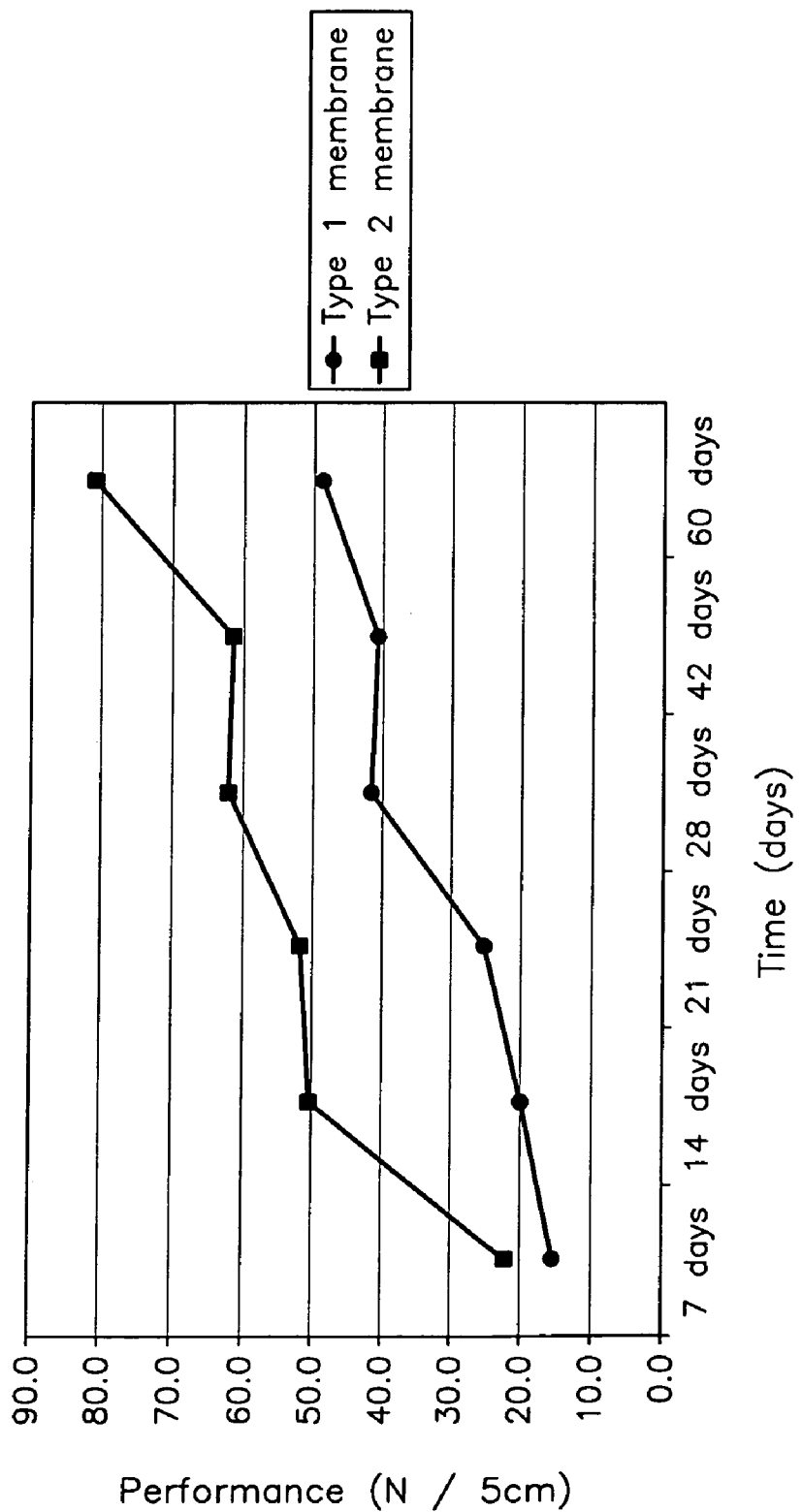

BITUMINOUS COLD GLUE

This application has a priority of European no. 09150810.1 Filed Jan. 16, 2009, hereby incorporated by reference.

The present invention relates to a bituminous cold glue for cold gluing of construction material and comprising at least 35% by weight of bitumen and at least 10% by weight of oil, and further comprising clay and a dispersing agent.

Such a cold glue is known from GB-A-2205104. The known glue is a two components glue having one component mainly comprising bitumen and another component comprising a liquid factice made from drying or semi-drying vegetable oil compound and sulphur. The known glue is used for constructions in highways or bridges. The cold glue is made of two components in order to avoid the use of volatile organic solvents which are harmful for the environment and for public health.

Although the known cold glue avoids using volatile organic solvents, it nevertheless has the disadvantage that it is a two component glue. This requires not only the storage of two different containers but also their transport and mixing when they are applied.

It is an object of the present invention to realise a one component bituminous cold glue having only a relatively small amount of solvents, without adversely affecting the viscosity of the cold glue.

For this purpose, a bituminous cold glue according to the present invention is characterised in that said oil is a vegetable oil compound, based on a carbon chain comprising at least one of the C6 to C12 carbon atoms and further comprising between 0.1 and 5% by weight of a solvent. The presence of vegetable oil compound, based on a carbon chain comprising at least one 6 to 12 carbon atoms offers to realise a stable mono-component glue having a viscosity which offers an easy handling of the glue during application. As the amount of solvent is less than 3% by weight, the glue can be qualified as solventless glue.

BRIEF DESCRIPTION OF THE DRAWINGS

FIG. 1 is a graph, which shows viscosity as function of temperature for a glue according to the present invention compared with glues having organic solvents.

A first preferred embodiment of a bituminous cold glue according to the invention is characterised in that said solvent is formed by water or an alcohol. The use of water as a solvent offers the advantage to stabilise the glue. Moreover, water is an environment friendly substance.

A second preferred embodiment of a bituminous cold glue according to the invention is characterised in that said vegetable oil compound forms between 10 and 30% by weight of said bituminous cold glue. With this amount of oil, a viscosity of 10 to 20 Pa·s at 5 $s^{-1}$ and 20° C. is obtained.

A third preferred embodiment of a bituminous cold glue according to the invention is characterised in that said vegetable oil compound comprises a mixture of vegetable oil compounds based on a carbon chain comprising 6 to 8 carbon atoms, or 8 to 10 carbon atoms, or 10 to 12 carbon atoms, or a mixture thereof. The mixture of two or more vegetable oil compounds comprising carbon chains with a different number of carbon atoms, enables to improve the properties of the glue, in particular for what concerns the viscosity.

Preferably said vegetable oil compound based on 6 to 12 carbon atoms is a vegetable oil ester or a fatty acid.

Preferably said C10 vegetable oil compound is formed by an ester being an isopentyl caprylate caprate or an n-butyl decanoate and C8 being a methyl ester. Alternatively said C12 vegetable oil ester is a methyl laurate and said C10 being a methyl ester. These vegetable oil compounds are easily available on the market.

Preferably said glue further comprises fibres, in particular cellulose fibres, forming between 0.5 and 5% by weight of said glue. The use of fibres gives the glue a structure.

The invention will now be described in more details in the description given below and with reference to FIG. 1 illustrating test results.

The bituminous cold glue according to the present invention is provided for cold gluing of construction material such as bituminous membranes, metal roof sheets, insulation panes, etc. The cold glue comprises at least 35% by weight of bitumen and preferably between 35 and 55% by weight of bitumen, more preferably 45% by weight, which offers good watertight properties without affecting the thixotropic properties of the glue and without substantially increasing the viscosity. Moreover, since bitumen has inherent adhesive properties; the presence of the bitumen contributes to the adhesive properties of the glue. The used bitumen preferably has the property of having a penetration of 20 to 500 dmm (1/10 mm) when measured by a needle-penetration method.

The bituminous cold glue according to the invention further comprises at least 10% by weight of oil formed by a vegetable oil compound based on a carbon chain comprising at least one of the C6 to C12 carbon atoms. Preferably, the vegetable oil compound forms between 10 and 30% by weight of the bituminous cold glue. This offers to produce a mono-component glue, having a viscosity of 10 to 20 Pa·s at 5 $s^{-1}$ and 20° C. The vegetable oil compound can be formed by only one oil, but is preferably composed of a mixture of different vegetable oils, such as for example oils with C6 and C8 carbon atoms, C8 and C10 carbon atoms, C10 an C12 carbon atoms, or a mixture thereof. The mixture of different vegetable oil compounds improves the properties of the glue, in particular for what concerns the thixotropic properties in wet conditions and the sensibility to temperature fluctuations. Also a mixture of different vegetable oil compounds has shown a better long term stability and enables to keep the glue fluid even when it remains in contact with ambient air for a longer period, for example for five hours.

In particular a mixture of 10-30% by weight of vegetable C10 oil formed by isopentyl caprylate caprate (isoamyl laurate), or n-butyl decanoate or a C12 oil formed by methyl laurate and 0.1-5% by weight of vegetable C8 oil compounds formed by a methyl ester has proven to have excellent thixotropic properties.

The bituminous cold glue according to the invention further comprises between 0.1 and 5% by weight of a solvent. This solvent is preferably water as the latter is environment friendly and easy to obtain. However an organic solvent such as an alcohol or white spirit may also be used. In case of the use of alcohol, methanol or ethanol are preferred. Using water as a solvent has the further advantage that it is also an inorganic solvent, which mixes well with the vegetable oil compound. Moreover, the use of water will further improve the thixotropic properties of the glue and reduce the sensibility to temperature fluctuations, as the viscosity is less dependent on the temperature when compared with solvents of glues based on volatile organic solvents. The annexed figure shows the viscosity as function of the temperature for a glue (graph a) according to the present invention and glues (b, c) having organic solvents. As can be seen in this figure, the viscosity remains lower over the whole temperature range for the glue (a) according to the present invention.

The cold glue according to the present invention has, due to the use of the vegetable oil compound, the advantage to use only a small quantity or even non volatile organic solvent, thereby substantially limiting air pollution and still providing good viscosity properties. The glue according to the present invention can also be used on a wet or humid substrate without the need of drying the latter before application of the glue, thereby substantially reducing the application time. Indeed, the water will mix with the glue, due to the presence of the vegetable oil compounds. Also the presence of water in the glue will prevent the glue to collapse over time, thereby improving the storage time up to more than three years.

nous primer and dried for minimum 12 hours. The results were obtained after 28 and 56 days at room temperature and 28 and 56 days at 70° C. The values are always an average of different tests.

TABLE

Results of the peeling test on different supports at after 28 and 56 days of aging.

| Membrane | Support | 28 days room temperature (N/5 cm) | 28 days 70° C. (N/5 cm) | 56 days at room temperature (N/5 cm) | 56 days at 70° C. (N/5 cm) |
|---|---|---|---|---|---|
| Type 1 | Concrete with bituminous primer | 8 | 42 | 10 | 48 |
| Type 2 | Concrete with bituminous primer | 11 | 62 | 26 | 80 |

The glue according to the present invention further preferably comprises 0.1 to 1% of a dispersing agent in order to improve the thixotropic properties. Adding fibres, in particular cellulose fibres, forming between 0.5 and 5% by weight of the glue will also positively contribute to the thixotropic properties.

A filling agent, in particular CaCO3, forming between 25 and 45% by weight can also be added. Finally, clay forming between 0.5 and 4% by weight of the glue can be added for further improving the thixotropic properties. Preferably attapulgite clay is used.

In the table given hereafter an example of the components of a bituminous cold glue according to the invention is presented. The indicated amounts are given with respect to the total composition of the glue.

| Component | Amount in % by weight |
|---|---|
| Adhesive: | |
| Bitumen 70/100 dmm | 40-50 |
| Additive: | |
| Water as solvent | 1-3 |
| Vegetable Oil: | |
| Isopentyl caprylate caprate | 15-20 |
| Rheologic additive: | |
| Clay | 1-2 |
| Surfactant | 0.1-0.4 |
| Filler: | |
| Filler | 29-33 |
| Reinforcing fibres; | |
| Cellulose fibres | 0.7-2 |

In order to test the peeling performance of the bituminous cold glue according to the invention, a peeling test was performed. For this test bituminous membranes each of 5×35 cm, but of different composition, where glued on different supports. Each time a quantity of 1 kg/m² was used for the adhesion of the bituminous membrane on the support, thereby using the bituminous cold glue according to the invention. The peeling test was performed at a speed of 100 mm/min. The results are presented in the table given hereunder and presented as N/5 cm (Newton/5 cm). The surface of the support was used as such, wetted or first treated with a bitumi-

TABLE

Results of the peeling test on different supports after 28 days of aging.

| Membrane | Support | 28 days room temperature (N/5 cm) | 28 days 70° C. (N/5 cm) |
|---|---|---|---|
| Type 1 | Concrete with bituminous primer | 8 | 42 |
| | Dry concrete | 8 | 26 |
| | Wet concrete | 7 | 43 |
| | Wood | 5 | 26 |
| | Wood with bituminous primer | 7 | 33 |
| | Metal | 7 | 31 |
| | Metel with bituminous primer | 7 | 48 |
| Type 2 | Concrete with bituminous primer | 11 | 62 |
| | Dry concrete | 7 | 77 |
| | Wet concrete | 8 | 85 |
| | Wood | 7 | 96 |
| | Wood with bituminous primer | 6 | 96 |
| | Metal | 6 | 90 |
| | Metal with bituminous primer | 8 | 81 |

When for the same glue the performance is evaluated in time on a support of concrete impregnated with bituminous primer, the results for two different types of bituminous waterproofing membranes are shown in FIG. 1, which the required force in function of the time. As shown in this figure, after artificial aging (28 or 56 days at 70° C.) the performance of the glue increases spectacularly yielding a high performance glue for the different supports and bituminous membranes.

Also the perpendicular performance was tested on different supports with bituminous membranes of 10×10 cm (maximum value at break). The test was carried out at a speed of 10 mm/min. The samples were evaluated after 3 hours, 24 hours, 7 days and 28 days at room temperature. Each time 1 kg/m² of the glue is used. The results are shown in the table given hereunder.

TABLE

Results of the perpendicular peeling test on different supports at room temperature (maximum value at break)

| Membrane | Support | 3 hours (N/100 cm²) | 24 hours (N/100 cm²) | 7 days (N/100 cm²) | 28 days (N/100 cm²) |
|---|---|---|---|---|---|
| Type 1 | Concrete with bituminous primer | 101 | 467 | 908 | 1264 |
|  | Wood with bituminous primer | 85 | 121 | 388 | 1089 |
|  | Poly urethane isolation | 105 | 268 | 362 | 774 |

After aging at room temperature for, the performance at break (perpendicular) increases spectacular when applied on the different supports in function of time (from 3 hours to 28 days).

The invention claimed is:

1. A bituminous cold glue for cold gluing of construction material and comprising at least 35% by weight of bitumen and at least 10% by weight of oil, and further comprising clay and a dispersing agent, wherein said oil is a vegetable oil based on a carbon chain of C6 to C12 carbon atoms, and further comprising between 0.1 and 5% by weight of a solvent.

2. A bituminous glue comprising (a) at least 35% by weight of bitumen, (b) at least 10% by weight of a C6 to C12 carbon-chain vegetable oil or mixture thereof, (c) clay, (d) a dispersing agent, and (e) 0.1-5% by weight of a solvent.

3. The bituminous glue as claimed in claim 2, wherein the solvent is water.

4. The bituminous glue as claimed in claim 2, wherein the solvent is an alcohol.

5. The bituminous glue as claimed in claim 2, wherein the solvent is methanol or ethanol.

6. The bituminous glue as claimed in claim 2, wherein the vegetable oil forms between 10 and 30% by weight of the bituminous glue.

7. The bituminous glue as claimed in claim 2, wherein the vegetable oil is a mixture selected from the group consisting of C6 to C8 carbon-chain vegetable oils, C8 to C10 carbon-chain vegetable oils, C10 to C12 carbon-chain vegetable oils, and C6 to C12 carbon-chain vegetable oils.

8. The bituminous glue as claimed in claim 2, comprising between 10 and 30% by weight of a C10 or C12 vegetable oil and between 0.1 and 5% by weight of C6 or C8 vegetable oil.

9. The bituminous glue as claimed in claim 2, wherein the vegetable oil is an ester or a fatty acid vegetable oil.

10. The bituminous glue as claimed in claim 2, wherein the vegetable oil comprises a mixture of isopentyl caprate vegetable oil and C8 methyl ester vegetable oil, a mixture of n-butyl decanoate vegetable oil and C8 methyl ester vegetable oil, or a mixture of methyl laurate vegetable oil and C10 methyl ester vegetable oil.

11. The bituminous glue as claimed in claim 2, wherein the dispersing agent forms 0.1 to 1% by weight of the glue.

12. The bituminous glue as claimed in claim 2, further comprising between 0.5 and 5% by weight of fibres.

13. The bituminous glue as claimed in claim 2, further comprising between 0.5 and 5% by weight of cellulose fibres.

14. The bituminous glue as claimed in claim 2, further comprising between 25 and 45% by weight of a filling agent.

15. The bituminous glue as claimed in claim 2, further comprising between 25 and 45% by weight of $CaCO_3$.

16. The bituminous glue as claimed in claim 2, wherein the clay forms between 0.5 and 4% by weight of the glue.

17. The bituminous glue as claimed in claim 2, wherein the clay is attapulgite clay and forms between 0.5 and 4% by weight of the glue.

\* \* \* \* \*